United States Patent [19]
Naoi et al.

[11] Patent Number: 5,882,819
[45] Date of Patent: Mar. 16, 1999

[54] SULFIDE-SERIES ELECTRODE MATERIAL AND SECONDARY BATTERY WITH HIGH ENERGY DENSITY

[75] Inventors: Katsuhiko Naoi, Tokyo; Akihiko Torikoshi; Yasuhiro Suzuki, both of Shizuoka, all of Japan

[73] Assignee: Yazaki Corporation, Tokyo, Japan

[21] Appl. No.: 720,033

[22] Filed: Sep. 27, 1996

[30] Foreign Application Priority Data

Sep. 28, 1995 [JP] Japan ................................. 7-251403
Aug. 12, 1996 [JP] Japan ................................. 8-212737

[51] Int. Cl.$^6$ .................................................. H01M 4/60
[52] U.S. Cl. ........................................... 429/218; 429/213
[58] Field of Search ..................................... 429/218, 213

[56] References Cited

U.S. PATENT DOCUMENTS

| | | | |
|---|---|---|---|
| 4,833,048 | 5/1989 | Dejonghe et al. | 429/104 |
| 5,324,599 | 6/1994 | Oyama et al. | 429/192 |
| 5,348,819 | 9/1994 | Uemachi et al. | 429/213 |
| 5,460,905 | 10/1995 | Skotheim | 429/213 |
| 5,580,681 | 12/1996 | Fleischer | 429/192 |

OTHER PUBLICATIONS

Liu, Meilin et al., "Electrochemical Properties of Organic Disulfide/Thiolate Redox Couples", J. Electrochem. Soc., 136(9):2570–2575 (1989).

Shi et al. "Studies of Electrochemical and Mass Transport Properties of a Thiolate/Disulfide Redox Couple . . . " Electrochima Acta, vol. 40, No. 13–14, pp. 2435–2429, (no month), 1995.

CA accesession No.: 88:151689, Tochtermann et al. "Carbon –13 NMR spectra of heterocycles." (no month available), 1978.

*Primary Examiner*—Stephen Kalafut
*Assistant Examiner*—Carol Chaney
*Attorney, Agent, or Firm*—Finnegan, Henderson, Farabow, Garrett & Dunner, L.L.P.

[57] ABSTRACT

An electrode material includes a sulfide compound containing a tetrazole ring as an active substance. The secondary battery using such a material provides an extremely high energy density.

19 Claims, 7 Drawing Sheets

F I G. 1
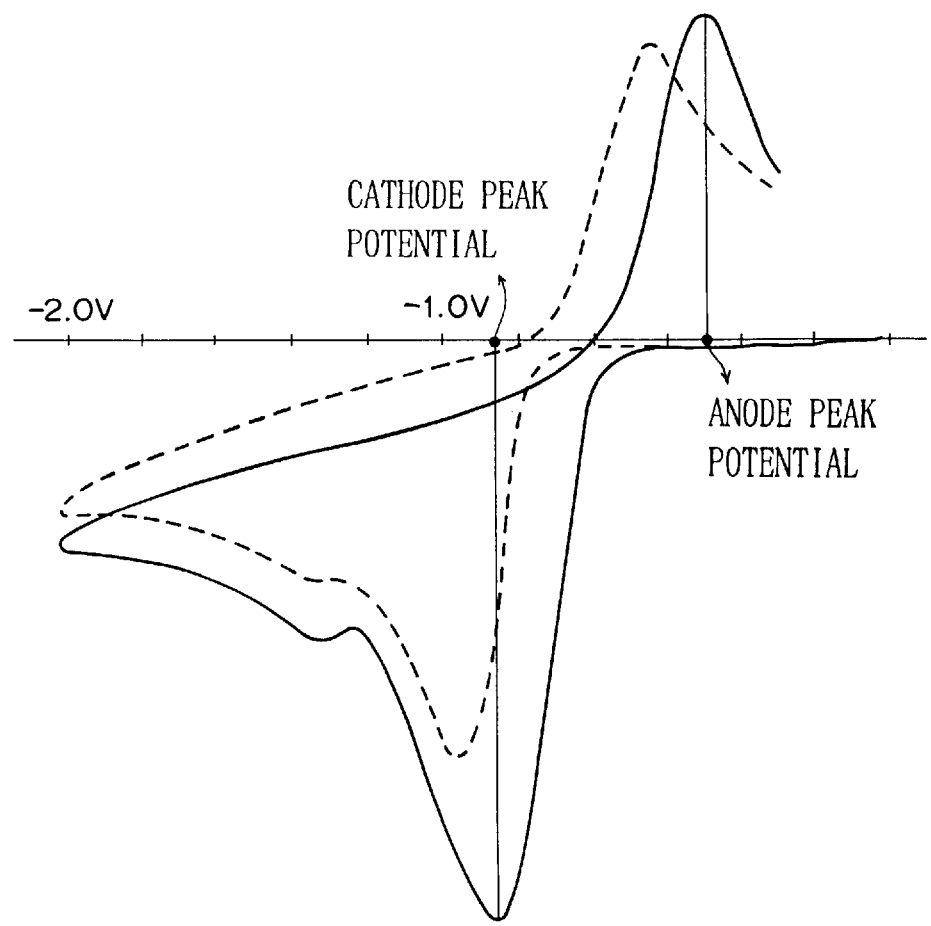

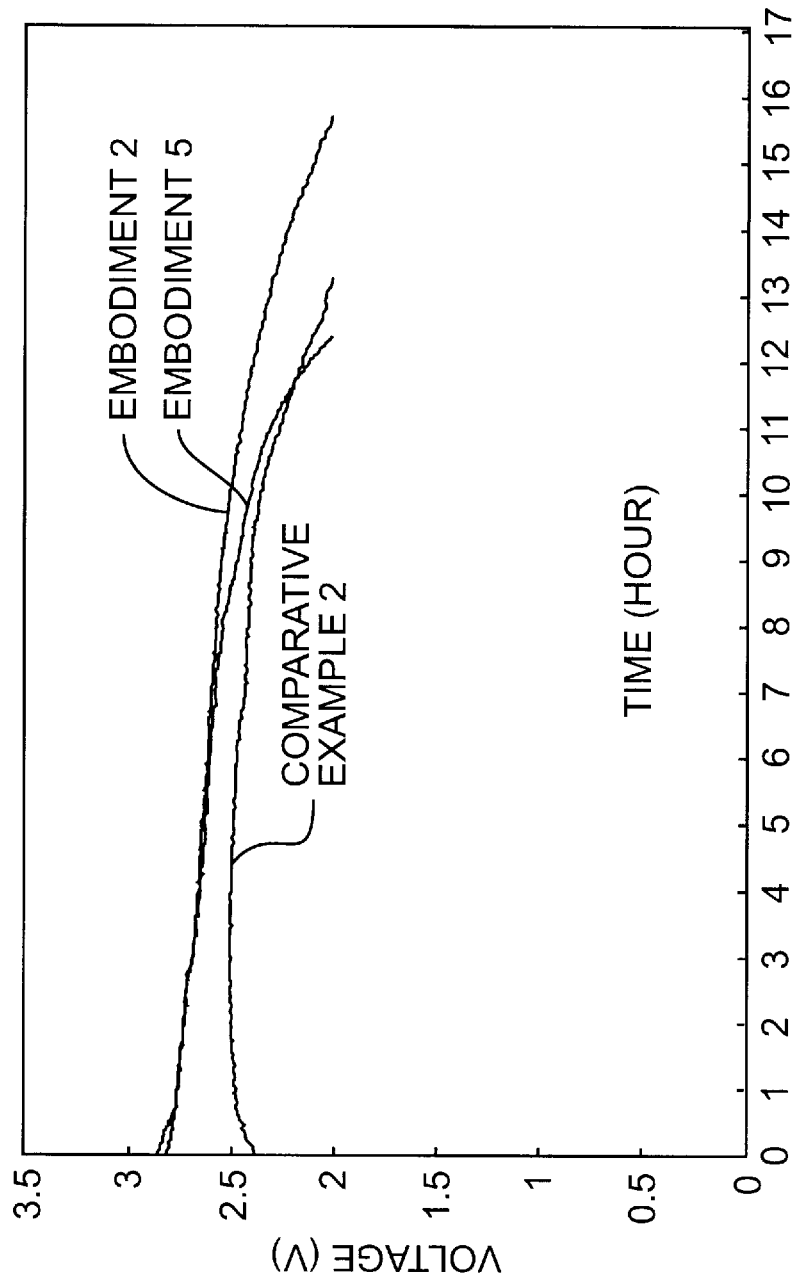

SULFIDE-SERIES ELECTRODE MATERIAL AND SECONDARY BATTERY WITH HIGH ENERGY DENSITY

BACKGROUND OF THE INVENTION

1. Field of the Invention

The present invention relates to an electrode material for a secondary battery, and more particularly to a sulfide series electrode material.

2. Description of the Prior Art

In recent years, demands for portability of communication appliances and OA (Office Automation) appliances have intensified competition for lightweight and miniaturized products. Correspondingly, a secondary battery which is used in such an appliance or as a power source for an electric vehicle requires high efficiency. Under such circumstances, various kinds of batteries using new electrode materials have been developed. Among them, an electrode material using a disulfide compound (hereinafter referred to as "disulfide electrode material") has been noticeable because of its relatively high energy density as disclosed in U.S. Pat. No. 4,833,048, the disclosure of which is incorporated herein by reference. For example, a sulfide compound having a triazine ring or a thiadiazole ring has been used as an electrode material.

Assuming that the disulfide compound is represented by R—S—S—R (R denotes an organic functional group), the disulfide bond (S—S bond) is cleaved by supply of two electrons by electrolytic reduction. It is combined with a cation or proton ($M^+$) in an electrolytic solution to provide a salt represented by 2 (R—S·$M^+$). The salt is returned to original R—S—S—R by electrolytic oxidation to discharge two electrons. The secondary battery is expected to have an energy density of 50 Wh/kg or more, which is approximately equal to that of other ordinary secondary batteries.

However, as reported by the inventors of the above U.S. Patent in *J. Electrochem. Soc.*, Vol. 136., No. 9, pages 2570–2575 (1989), the electron moving speed in an electrode reaction of the sulfide-series secondary battery is very low so that it is difficult to take out a large current for practical use at room temperatures. The above sulfide-series secondary battery is limited for use at 60° C. or higher.

As a technique for improving the sulfide-series secondary battery so as to deal with a large current, as disclosed in JP-A-5-74459, an electrode material in which an organic compound having a thiadiazole ring and a disulfide group are combined with a conductive polymer, such as polyaniline, has been proposed.

However, the secondary battery according to the prior art can increase the current because of an increase in the reaction speed, but it cannot improve the energy density; rather, the energy density is lowered.

SUMMARY OF THE INVENTION

An object of the present invention is to provide a sulfide-series electrode material which can improve energy density and provide a secondary battery with an extremely high energy density.

In order to attain the above object, there is provided a sulfide-series electrode material having a tetrazole ring.

In accordance with the present invention, the tetrazole ring including four nitrogen atoms in the ring exhibits redox activity by an interaction of the nitrogen atoms, like an organic electrode material including other aromatic heterocycles. The molecular weight of the heterocycle ring is smaller than thiadiazole (having sulfur in the molecule) by approximately 17%, thereby reducing the mass of the sulfide compound which is the material of a positive electrode (hereinafter referred to as "cathode"). The potential of the redox is higher than in the case where thiadiazole is used, so that a higher voltage can be taken out.

The secondary battery using an electrode material according to the present invention can provide a much higher energy density than that using an ordinary electrode material. In addition, the secondary battery, which provides a high reaction speed, can suppress reduction in the using rate of the cathode even when a discharging current is increased.

The above and other objects and features of the present invention will be more apparent from the following description taken in conjunction with the accompanying drawings.

BRIEF DESCRIPTION OF THE DRAWINGS

FIG. 1 is a cyclic voltamogram of Battery No. 1 according to an embodiment (Embodiment 1) of the present invention and Battery No. 2 according to a comparative example (Comparative Example 1);

FIG. 7 is a graph showing the discharging curve (current density: 0.2 mA/cm$^2$) in cells using active materials α, δ and η.

DESCRIPTION OF THE PREFERRED EMBODIMENTS

Figure 2:
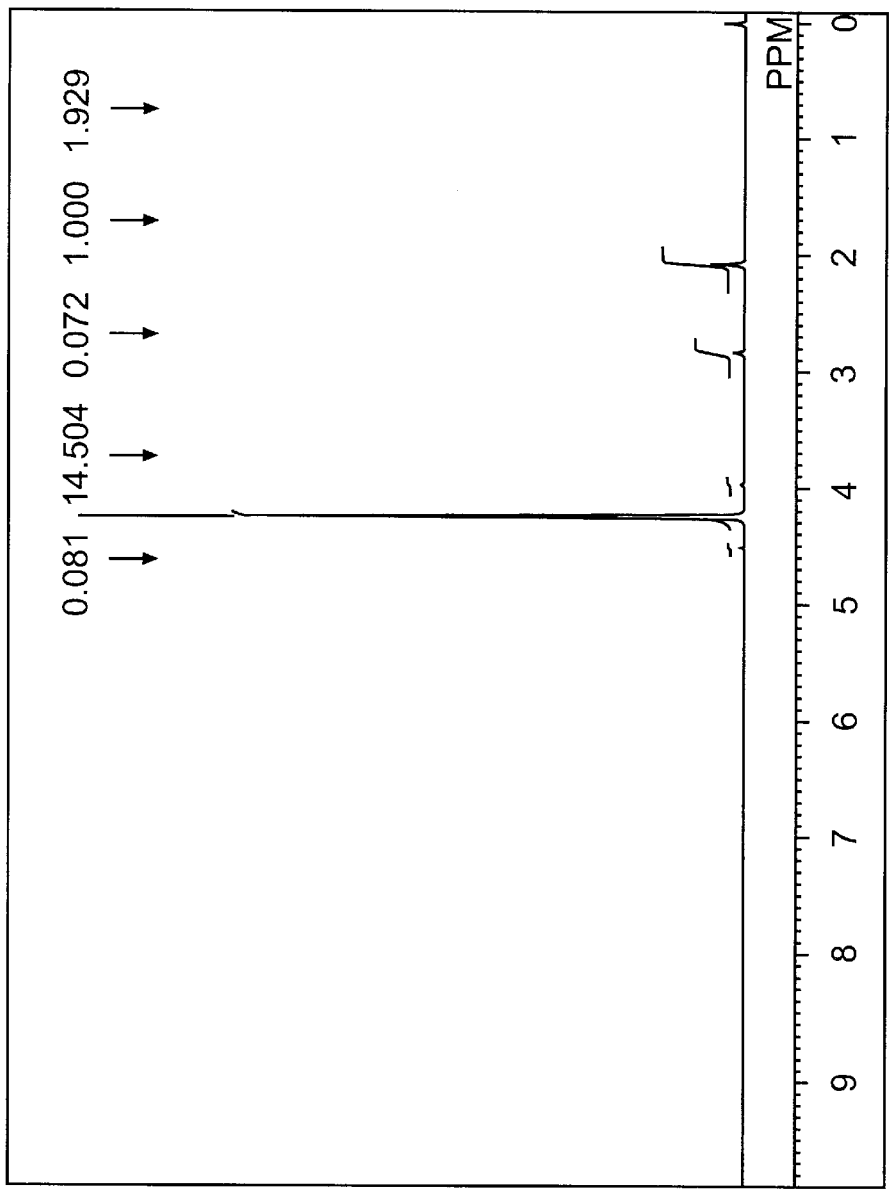
FIG. 2 is a graph showing the $^1H$—NMR spectrum of an active material α.

In the present invention, a sulfide-series electrode material having a tetrazole ring means a compound in which a sulfur atom is directly combined with the tetrazole ring, and a material containing such a compound.

The composition having the tetrazole ring which has two sulfur atoms per one tetrazole ring constitutes an oligomer or polymer, which improves the energy density.

Some sulfide-series electrode materials having such a tetrazole ring have preferably a group represented by chemical formula (1) or an ion represented by chemical formula (2) because of their high energy density and easy synthesis. Particularly, a dimer represented by chemical formula (3) is preferable since it gives very small reduction in the capacitance even if the number of cycles is increased. The polysulfide compound, such as trisulfide, having n ranging from 1 to 5 in chemical formula (3) can have a higher energy density, and is therefore preferable.

Chemical Formula (1):

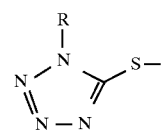

where R represents a hydrogen atom or an organic group.

Chemical Formula (2):

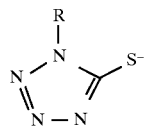

where R represents a hydrogen atom or an organic group.

Chemical Formula (3):

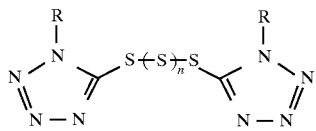

where R represents a hydrogen atom or an organic group, and n represents an integer of 0 to 5.

However, in the group represented by chemical formula (1), the ion represented by chemical formula (2), and the material represented by chemical formula (3), although R may be an alkyl group (such as a methyl group, ethyl group, etc.), an amino group, a carboxyl group, an alkyl amino group, an amide group, an aromatic compound, or a hydrogen, it is preferably a group capable of supplying electrons, such as a methyl group.

Since the above active material is not conductive, it is mixed with an electrically conductive material and an ionic conductive material to fabricate a cathode. The electrically conductive material may be metallic powder of carbon, titanium, nickel, etc. The ionic conductive material may be a liquid electrolyte in which electrolytic acid, such as perchlorate, is mixed with solvent, such as propylene carbonate, or a solid polymer electrolyte, such as polyethylene oxide, in which the electrolytic acid is solved.

Both a liquid electrolyte and a polymer solid electrolyte can be used as an electrolyte of the battery. The anode material may be an alkaline metal or a material with alkaline metal removed or inserted.

[Embodiment 1]

Evaluation by cyclic voltammetry using 5,5'-dithiobis (methyltetrazole)

1. Synthesis of 5,5'-dithiobis (1-methylterazole)

Iodine of 5 mmol is solved in methanol of 30 ml in an argon atmosphere. Into the solution thus formed, a solution of 5-mercapto-1-methyltetrazole of 10 mmol and sodium methoxide of 5 mmol dissolved in methanol is dropped slowly. Thereafter, the solution thus formed is stirred for three hours, and cooled to −60° C. Then, the precipitate thus created is separated by filtration. The precipitate is dried in a decompressing atmosphere, and recrystallized three times by ethanol to provide 5,5'-dithiobis (1-methyltetrazole).

2. Synthesis of 2,2'-dithiobis (5-methyl 1,3,4-thiadiazole) (Comparative Example 1)

Likewise, 2,2'-dithiobis (5-methyl 1,3,4-thiadiazole) is synthesized using 2-mercapto-5-methyl-1,3,4-thiadiazole in place of 5-mercapto-1-methyl tetrazole.

Incidentally, in the filtration step in both cases, the filtrate contains both the filtering medium and some of the desired material. Therefore, the remainder of the desired material is recovered and refined in a separate step. The details thereof are not described here.

The product thus created has been recognized to be the desired material by a FAB mass analyzer and an infrared spectroscopic analyzer and a NMR analyzer.

Using 5,5'-dithiobis (1-methyltetrazole) and 2,2'-dithiobis (5-methyl-1,3,4-thiasiazol), a battery was made. It should be noted that the above steps are performed in an argon atmosphere contained in a globe box.

As an electrolyte, two electrolytic solutions were prepared in which lithiumtrifluoromethanesulfonic ($LiCF_3SO_3$) is solved in γ-butyrolactone of 30 ml to provide a concentration of 0.2 mmol/l. The two synthesized disulfide compounds of 5,5'-dithiobis (1-methyl tetrazole and 2 2'-dithiobis (5-methyl-1,3,4-thiadiazole) were solved in the prepared solutions, respectively, to provide a concentration of 5 mmol/l.

Using these two solutions, with a sample electrode of glassy carbon, a counter electrode of a platinum wire, and a reference electrode of a silver-silver ion electrode, the battery was made. In this case, the battery having 5,5'-dithiobis (1-methyl tetrazole) was taken as Battery 1 (Embodiment 1), and the battery having 2,2'-methyl dithiobis (5-methyl-1,3,4-thiadiazole) was taken as Battery 2 (Comparative Example 1). The cyclic voltamograms of Batteries 1 and 2 were measured.

The measurement results are shown in FIG. 1.

As seen from FIG. 1, in the cyclic voltamograms of Batteries 1 and 2, the peak potentials between the anode peak potential and the cathode peak potential are approximately equal, but the peak currents are entirely different from each other, thus leading to entirely different reaction speeds. Further, Battery 1 according to the present invention exhibits both peak potentials shifted in a nobler or higher potential than those of Battery 2, thus providing higher voltages.

Further, it can be seen from FIG. 1 that the discharge capacity of Battery 1 is 1.7 times larger than that of Battery 2. This reveals that 5,5'-dithiobis (1-methyl tetrazole) gives higher chemical activity than 2,2'-methyl dithiobis (5-methyl-1,3,4-thiadiazole).

The reduction potential in Battery 1 is shifted to a higher potential than Battery 2 so as to give a larger amount of energy (product of the electricity for reduction and the voltage difference).

Since the molecular weight of 5,5'-dithiobis (1-methyl tetrazole) is smaller than that of 2,2'-methyl dithiobis (5-methyl-1,3,4-thiadiazole), the battery using 5,5'-dithiobis (1-methyl tetrazole) as an active material is more advantageous. Thus, it is apparent that the electrode material according to the present invention has much more excellent performance than the battery using the ordinary electrode material, i.e., 2,2'-methyl dithiobis (5-methyl-1,3,4-thiadiazole).

Embodiments 2–7

The test results from coin-type secondary batteries follow. In these tests, in the steps where mixing of nitrogen, oxygen, and water was performed, the work was carried out within an argon gas flow as necessity requires. Dehydrated and distilled solvent was used as necessity requires.

A. Synthesis of active materials:

[Embodiment 2]

Synthesis of 5,5'-dithiobis (1-methyltetrazole)

Within a flask having a capacity of 1000 ml, 5-mercapto-1-methyltetrazole of 1000 mmol is solved in methanol of 450 ml, and the solution thus formed is cooled by water bathing. Into the solution thus prepared, 34.5% hydrogen peroxide of 20 ml is dropped slowly. At several minutes after dropping, the reaction generates heat, thus creating precipitate.

The precipitate, after filtration, is washed and thereafter dried in a decompressing atmosphere, thus providing 5,5'-dithiobis (1-methyl tetrazole), which is represented by Chemical Formula (4) (hereinafter referred to as "active material α").

Chemical Formula (4):

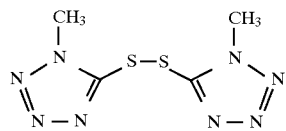

[Embodiment 3]

Synthesis of 5,5'-trithiobis (1-methyltetrazole)

Within a flask having a capacity of 1000 ml, 5-mercapto-1-methyltetrazole of 1000 mmol is solved in diethylether of 800 ml, and the solution thus formed is cooled by water bathing. Into the solution thus prepared, 1.25 mol/l sulfur dichloride/diethyl ether of 100 ml is dropped slowly. The solution is gradually clouded so as to create precipitate. Upon completion of the dropping, the solution was stirred for one hour, cooled to 40° C. and further precipitated. The precipitate after filtration is washed by diethylether and subsequently dried in a decompressing atmosphere, thus providing 5,5'-trithiobis (1-methyl tetrazole), which is represented by chemical formula (5) (hereinafter referred to as "active material β").

Chemical Formula (5):

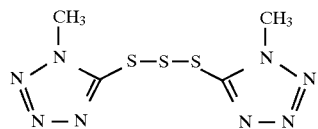

[Embodiment 4]

Synthesis of 5,5'-tetrathiobis (1-methyl tetrazole)

This procedure was like the synthesis of 5,5'-trithiobis (1-methyltetrazole), except that a solution of disulfurdichloride/diethylether solution of 1.25 mol/l is used in place of the solution of sulfur dichloride/diethyl ether of 1.25 mol/l. 5,5'-tetrathiobis (1-methyl tetrazole), which is represented by chemical formula (6) (hereinafter referred to as "active material γ"), is provided.

Chemical Formula (6):

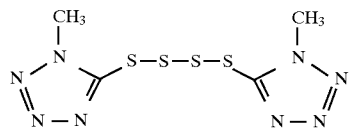

[Embodiment 5]

Synthesis of 5,5'-dithiobis (1-phenyl tetrazole)

This procedure was like the synthesis of 5,5'-dithiobis (1-methyltetrazole), except that 5-mercapto-1-phenyltetrazole was used in place of 5-mercapto-1-1-methyltetrazole. 5,5'-dithiobis (1-phenyl tetrazole), which is represented by chemical formula (7) (hereinafter referred to as "active material δ"), was obtained.

Chemical Formula (7):

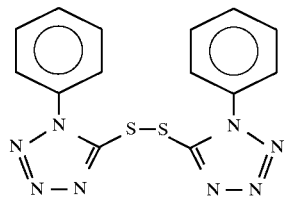

[Embodiment 6]

Synthesis of 5,5'-trithiobis (1-phenyltetrazole)

This procedure was like the synthesis of 5,5'-trithiobis (1-methyltetrazole), except that 5-mercapto-1-phenyltetrazole was used in place of 5-mercapto-1-1-methyltetrazole. 5,5'-trithiobis (1-phenyl tetrazole), which is represented by chemical formula (8) (hereinafter referred to as "active material ϑ"), was obtained.

Chemical Formula (8):

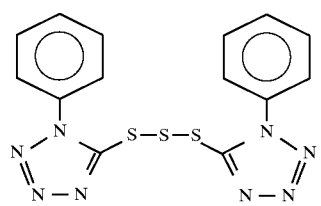

[Embodiment 7]

Synthesis of 5,5'-tetrathiobis (1-phenyltetrazole)

This procedure was like the synthesis of 5,5'-tetrathiobis (1-methyltetrazole), except that 5-mercapto-1-1-phenyltetrazole was used in place of 5-mercapto-1-1-methyltetrazole. 5,5'-tetrathiobis (1-phenyl tetrazole), which is represented by chemical formula (9) (hereinafter referred to as "active material ζ"), was obtained.

Chemical Formula (9):

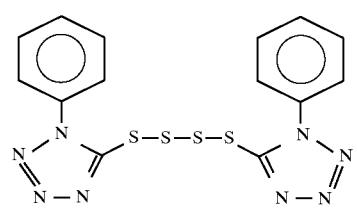

[Comparative Example 2]

Synthesis of 2,2'-dithiobis (5-methyl-1,3,4-thiadiazole)

Within a flask having a capacity of 1000 ml, 2-mercapto-5-methyl-1,3,4-thiadiazole of 150 mmol is solved in methanol of 450 ml. Into the solution thus prepared, 34.5% hydrogen peroxide of 39 ml is dropped slowly. The solution was stirred for one hour at room temperature. Thereafter, by decompression and heating, precipitate was created. The solution was filtered and washed. By the subsequent drying in a decompressing atmosphere, crude crystal was obtained. By recrystallization using ethanol, 5,5'-dithiobis (5-methyl-1,3,4-thiadiazole) (hereinafter referred to as "active material ε") was obtained.

[Comparative Example 3]

Synthesis of 2,2'-trithiobis (5-methyl-1,3,4-thiadiazole)

Within a flask having a capacity of 1000 ml, 2-mercapto-5-methyl-1,3,4-thiadiazole of 100 mmol is solved in tetrahydrofuran of 200 ml. Into the solution thus prepared, sulfur dichloride of 125 mmol is dropped slowly, thus giving precipitate. After the dropping, the solution was stirred at room temperature for 5–10 minutes. The solution was filtered and washed by tetrahydrofuran. The precipitate was dried in a decompressing atmosphere, thus providing 5,5'-trithiobis (5-methyl-1,3,4-thiadiazole) (hereinafter referred to as "active material θ").

[Comparative Example 4]

Synthesis of 2,2'-tetrathiobis (5-methyl-1,3,4-thiadiazole)

This procedure was like the synthesis of 2,2'-trithiobis (5-methyl-1,3,4-thiadiazole), except that disulfur dichloride of 125 mmol was used in place of sulfur dichloride, and 2,2'-tetrathiobis (5-methyl-1,3,4-thiadiazole (hereinafter referred to as "active material ι") was obtained.

B. Analysis of the Active Materials

Various kinds of analysis were performed for the active materials α–ζ. They include CHNS/O analysis (Perkinelemer Co. Inc. PE 2400 series II, CHNS/O analyzer), $^1$H—NMR spectrum analysis, and $^{13}$C—NMR spectrum analysis.

Figure 3:
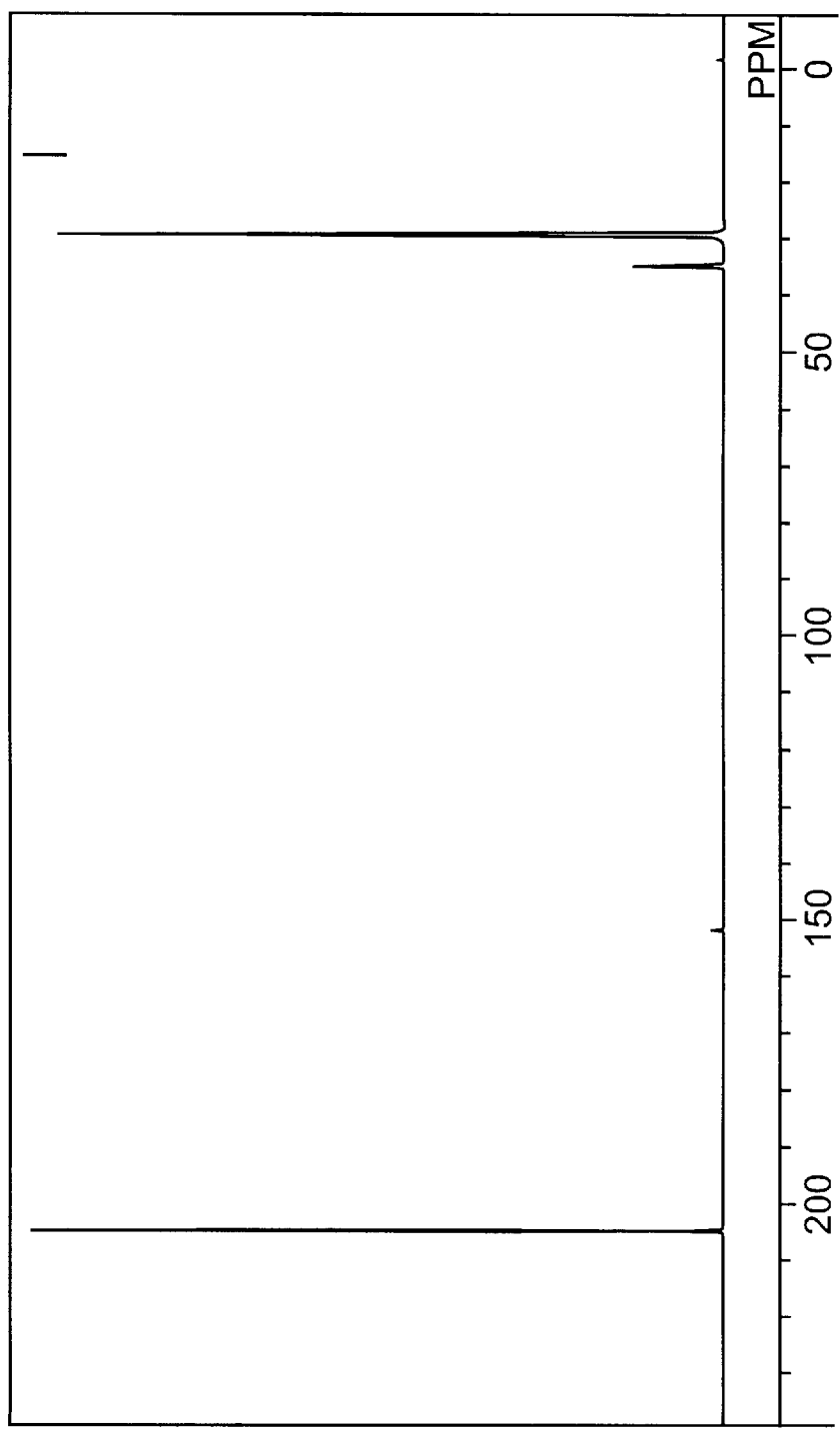
FIG. 3 is a graph showing the $^{13}C$—NMR spectrum of an active material α.
Figure 4:
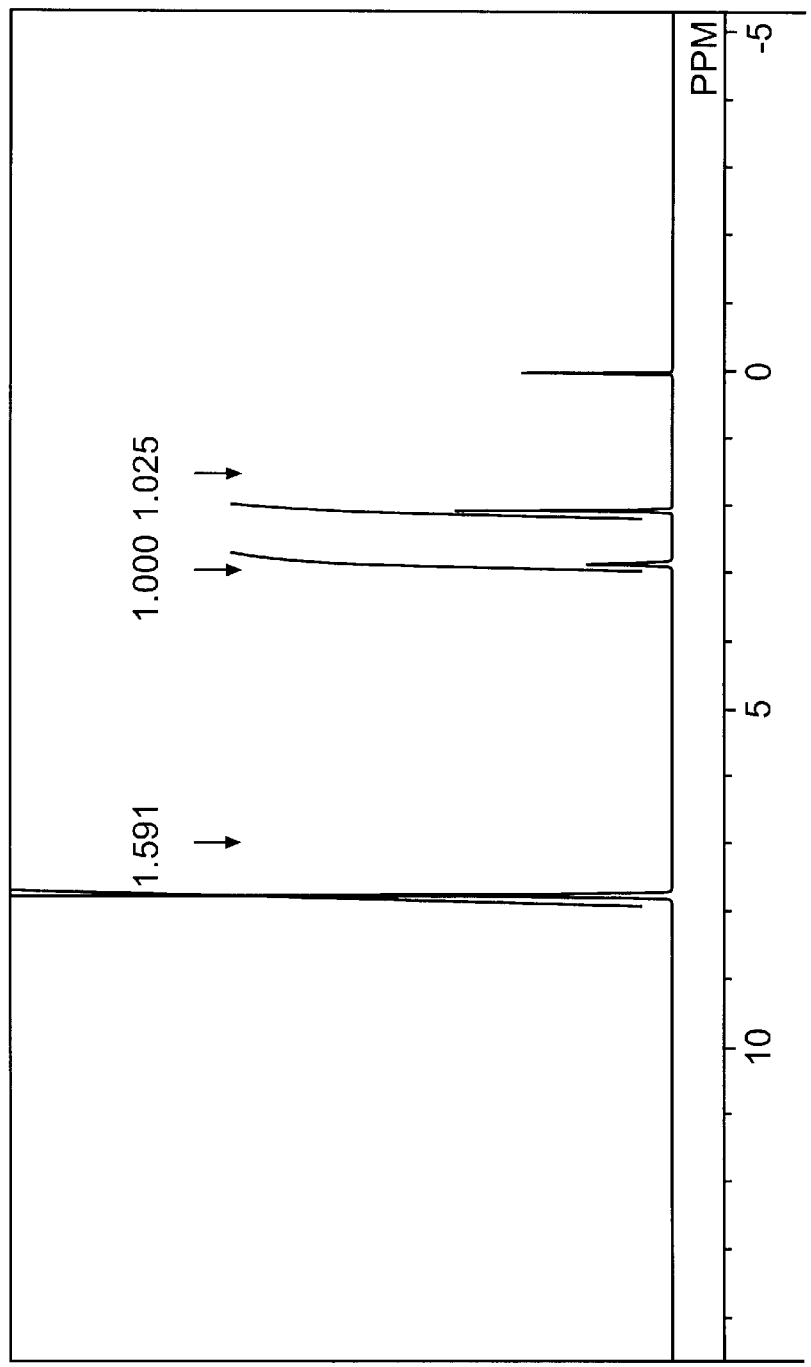
FIG. 4 is a graph showing the $^1H$—NMR spectrum of an active material δ.
Figure 5:
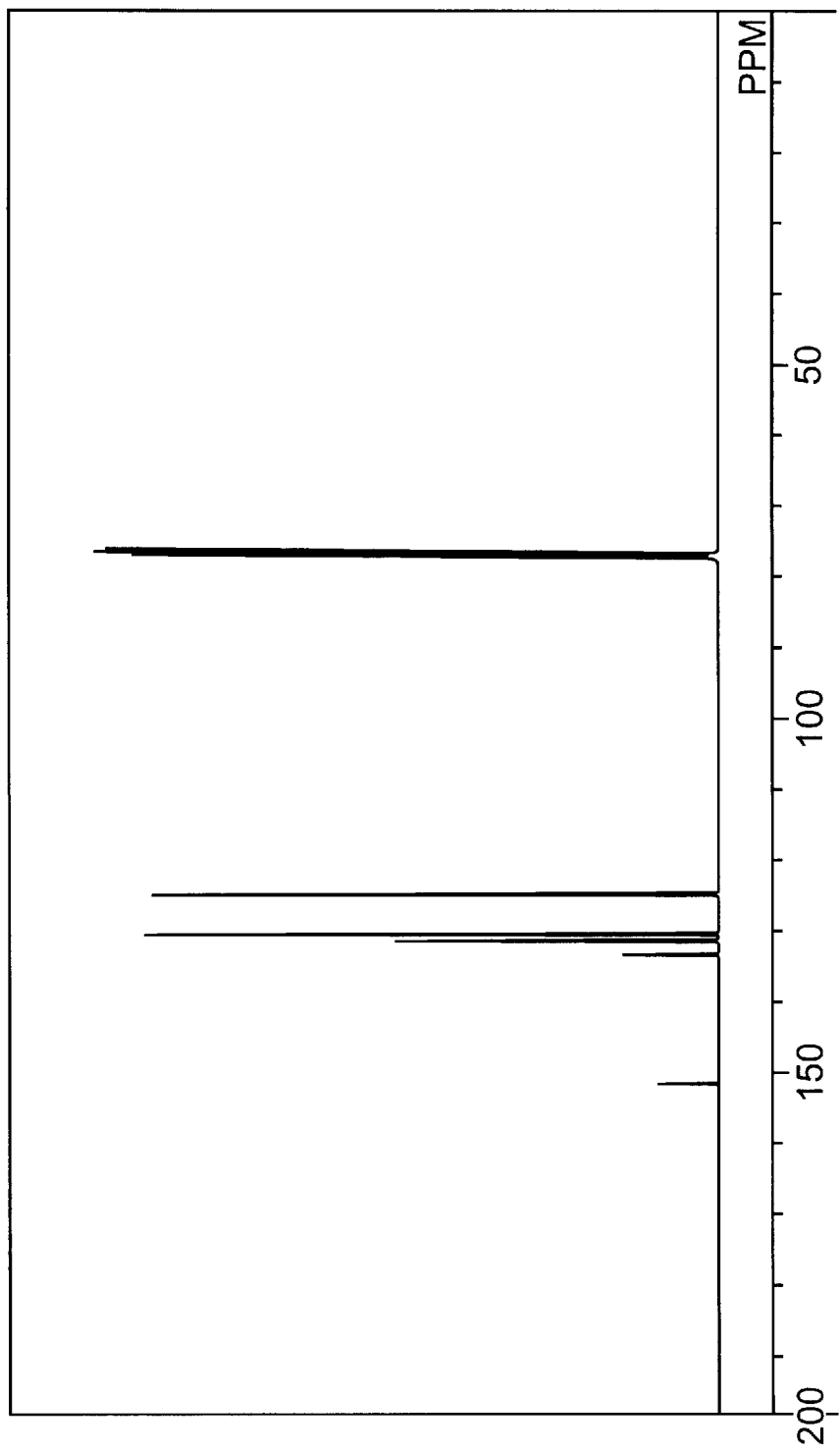
FIG. 5 is a graph showing the $^{13}C$—NMR spectrum of an active material δ.

Table 1 shows the CHNS analysis and O analysis (mass ratio of carbon, hydrogen, nitrogen, sulfur, and oxygen converted into an integer ratio using nitrogen as a standard), and the molecular weights recognized by the FAB-MS analysis. Table 2 shows the results of the $^1$H—NMR and $^{13}$C—NMR spectrum analysis. FIGS. 2 and 3 show $^1$H—NMR and $^{13}$C—NMR spectra, respectively, of the active material. FIGS. 4 and 5 show $^1$H—NMR and $^{13}$C—NMR spectra, respectively, of the active material δ.

TABLE 1

| Active Material | CHNS Analysis Result | | | | | FAB-MS Analysis Result |
| --- | --- | --- | --- | --- | --- | --- |
| | C | H | N | S | O | Molecular Weight |
| α | 4.0 | 6.0 | 8.0 | 2.0 | 0.0 | 230 |
| β | 4.0 | 6.0 | 8.0 | 3.0 | 0.0 | 262 |
| γ | 4.0 | 6.0 | 8.0 | 4.0 | 0.0 | 294 |
| δ | 14.0 | 10.0 | 8.0 | 2.0 | 0.0 | 354 |
| σ | 14.0 | 10.0 | 8.0 | 3.0 | 0.0 | 386 |
| ζ | 14.0 | 10.0 | 8.0 | 4.0 | 0.0 | 418 |

TABLE 2 unit: PPM

| Active Material | $^1$H-NMR | | | $^{13}$C-NMR | | |
| --- | --- | --- | --- | --- | --- | --- |
| | Deutrium Solvent | CH$_3$ Peak | C$_6$H$_5$ Peak | Deutrium Solvent | CH$_3$ Peak | C=N Peak | C$_6$H$_5$ Peak |
| α | Acetone | 4.20 | — | Chloroform | 33.5 | 150.9 | — |
| β | Chloroform | 4.31 | — | Chloroform | 37.0 | 160.9 | — |
| γ | Chloroform | 4.34 | — | Chloroform | 37.5 | 165.8 | — |
| δ | Acetone | — | 7.64~7.71 | Chloroform | — | 151.3 | 124.5, 130.1, 133.0 |
| ε | Acetone | — | 7.66~7.73 | Chloroform | — | 151.5 | 124.6, 130.2, 131.3, 133.2 |
| ζ | Acetone | — | 7.67~7.73 | Chloroform | — | 151.6 | 124.7, 130.3, 131.5, 133.4 |

C. Making a Cathode

Mixed are one of the above active materials α–ι of 33 weight parts, lithiumtrifluoromethane sulfonate (LiCF$_3$SO$_3$) of 18 weight parts, polyethylene oxide (molecular weight: two million) of 42 weight parts, and carbon black (Ketjenblack available from Lion Co. Ltd.) of 7 weight parts. For easy mixture, a small amount of acetonitrile is also added. The mixture is stirred until uniform. The slurry thus obtained is developed using a Teflon petri dish and dried day and night at 80° C. to provide a film (having an average thickness of 600 μm). The film is punched out to provide a cathode having a diameter of 15 mm.

D. Fabrication of a Solid Polymer Electrolyte

Acrylonitrile-methyl acrylate copolymer of 1.5 g and 6.0 ml of a γ-butyrolactone solution containing lithiumtrifluoromethane sulfonate (LiCF$_3$SO$_3$) having a concentration of 1 mol/l are mixed and developed on the petri dish. The developer is heated to 120° C. and gradually cooled. The developer is punched out to provide a film having a diameter of 15 mm. This serves as a separator in assembling a battery.

E. Making an Anode

The anode is made by punching out a lithium foil (having a thickness of 1.2 mm) to have a diameter of 15 mm.

Figure 6:
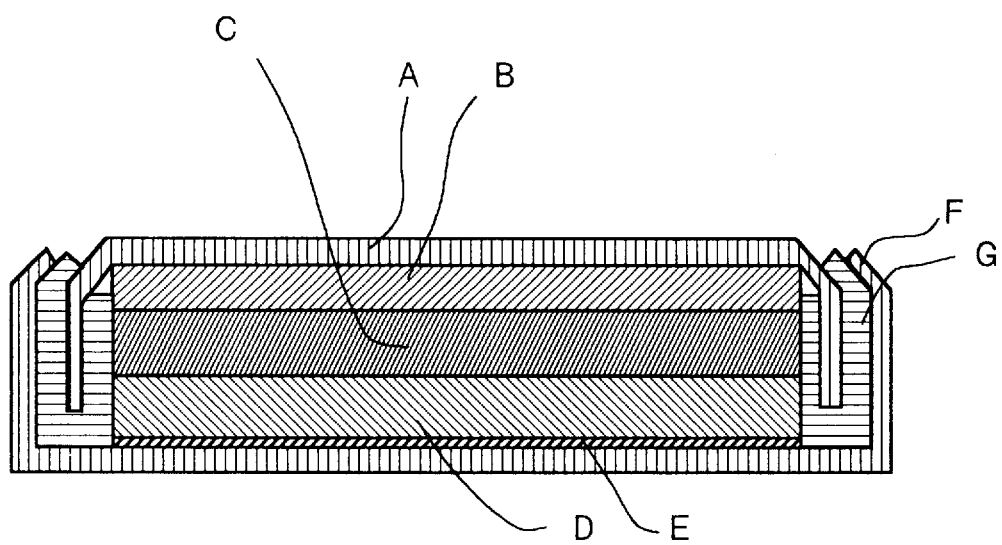
FIG. 6 is a view showing a coin-shaped cell fabricated in the embodiments.

F. Assembling a Coin-type Cell 18 coin-shaped cells (2 cells for each of the nine samples corresponding to Embodiments 2 to 7 and Comparative Examples 2 to 4) were fabricated using cathodes containing the above nine kinds of active materials, solid polymer electrolytes, and anodes. The section thereof is shown in FIG. 6. In FIG. 6, reference symbol A denotes an anode cap; B an anode; C a solid polymer electrolyte (serving as a separator); D a cathode; E a current collector made of stainless steel; F a cathode can; and G a gasket for separating the inside of the battery from the outside and preventing the anode cap from contacting the cathode can.

G. Evaluation of Coin-shaped Cells

The coin-shaped cells having the above active materials were evaluated as follows.

For one of the two cells having the same active material, a current of 0.2 mA/cm$^2$ was supplied to the cathode, whereas for the other thereof, a current of 0.4 mA/cm$^2$ was supplied to the cathode.

Charging/discharging was carried out within a thermostat bath at 20° C. The charging was performed until the cell voltage becomes 4.5 V at the above current density, whereas the discharging was performed until the cell voltage becomes 2.0 V. Before evaluation, charging/discharging is repeated twice and charging is carried out. The evaluation was performed at the subsequent discharging. The result at the current density of 0.2 mA/cm$^2$ is shown in Table 3, and that of the current density of 0.4 mA/cm$^2$ is shown in Table 4. In these tables, the specific capacity means discharge capacity per unit weight of the composite cathode, and the energy density means the value of the average voltage in discharging multiplied by the specific capacity. The utilization means the rate of the actual amount of electricity to that when assuming that the entire active material within the cathode contributes to discharging.

FIG. 7 shows a discharging curve (current density: 0.2 mA/cm$^2$) of the cells using the active materials α, δ and η for evaluation, which correspond to Embodiment 2, Embodiment 5 and Comparative Example 2).

TABLE 3

|  | Active Material | Specific Capacity (Ah/kg) | Average Discharge Cell-Voltage (V) | Energy Density (Wh/kg) | Utilization (%) |
| --- | --- | --- | --- | --- | --- |
| Embodiment 2 | α | 56.8 | 2.63 | 149.3 | 73.9 |
| Embodiment 3 | β | 88.8 | 2.60 | 230.8 | 65.8 |
| Embodiment 4 | γ | 105.3 | 2.59 | 272.7 | 58.4 |
| Embodiment 5 | δ | 45.3 | 2.63 | 119.1 | 90.8 |
| Embodiment 6 | σ | 73.2 | 2.62 | 191.8 | 80.0 |
| Embodiment 7 | ζ | 86.2 | 2.64 | 227.6 | 68.0 |
| Comparative Example 2 | η | 49.6 | 2.41 | 119.6 | 73.6 |
| Comparative Example 3 | θ | 76.2 | 2.39 | 182.1 | 63.4 |
| Comparative Example 4 | ι | 83.1 | 2.33 | 193.6 | 51.1 |

TABLE 4

|  | Active Material | Specific Capacity (Ah/kg) | Average Discharge Cell-Voltage (V) | Energy Density (Wh/kg) | Utilization (%) |
| --- | --- | --- | --- | --- | --- |
| Embodiment 2 | α | 54.6 | 2.58 | 141.0 | 71.1 |
| Embodiment 3 | β | 86.3 | 2.57 | 223.1 | 64.4 |
| Embodiment 4 | γ | 102.5 | 2.55 | 261.4 | 56.9 |
| Embodiment 5 | δ | 44.1 | 2.61 | 114.9 | 88.4 |
| Embodiment 6 | σ | 71.2 | 2.58 | 183.7 | 77.8 |
| Embodiment 7 | ζ | 83.0 | 2.54 | 210.8 | 65.4 |
| Comparative Example 2 | η | 44.1 | 2.39 | 105.3 | 65.4 |
| Comparative Example 3 | θ | 69.9 | 2.34 | 163.8 | 58.2 |
| Comparative Example 4 | ι | 76.3 | 2.32 | 176.9 | 46.9 |

As seen from the comparison of the secondary batteries (coin-type cells) according to the second to fourth embodiments with those according to the second comparative examples in Tables 3 and 4, the secondary batteries using the electrode materials adopted in the present invention have an average discharging cell voltage higher by about 300 mV than those of the secondary batteries using a thiadiazole ring. Thus, it was confirmed that the phenomenon in the cyclic voltammetry of the first embodiment and the first comparative example also applies to coin-type cells (secondary batteries). It can be seen that the secondary batteries using the electrode materials according to the present invention, which have higher average voltages and slightly higher capacity than those of the secondary batteries using the ordinary electrode materials having the thiadiazole ring, can provide a higher energy density than those of the latter. It can be seen that the secondary batteries using the active materials δ, ϑ and ζ having the phenyl group according to the fifth to seventh embodiments have a higher using rate than those of the secondary batteries according to the second to fourth embodiments using the active materials α, β and γ. This is probably attributable to the fact that any interaction between π electrons of a phenyl substituted group and those of carbon which serves as an electric collector improves the conductivity of the electrode and so improves the cathode utility.

Further, even if the discharging condition is increased from 0.2 mA/cm$^2$ to 0.4 mA/cm$^2$, the secondary battery using the electrode material according to the present invention provides a small reduction in the cathode using rate. Thus, it was confirmed that the secondary battery using the electrode material according to the present invention can deal with discharging by a large current.

What is claimed is:

1. A secondary battery comprising:
   a cathode made of a sulfide material having a tetrazole ring as an active material, wherein said tetrazole ring is a phenyl tetrazole ring; and
   an anode comprising an alkali metal.

2. The secondary battery according to claim 1, wherein said battery is a coin-shaped.

3. A secondary battery comprising:
   a cathode made of a sulfide material having a tetrazole ring as an active material, wherein said sulfide material is 5,5'-dithiobis (1-phenyl tetrazole), 5,5'-trithiobis (1-phenyltetrazole), or 5,5'-tetrathiobis (1-phenyltetrazole); and
   an anode comprising an alkali metal.

4. The secondary battery according to claim 3, wherein said battery is a coin-shaped.

5. An electrode comprising: an electrode material including a sulfide compound containing a tetrazole ring as an active substance, wherein the tetrazole ring of the sulfide compound includes a material represented by the following formula:

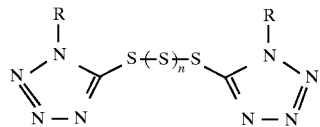

wherein each R represents a hydrogen atom or an organic group, provided that at least one R is a methyl group, and n is 1.

6. An electrode comprising: an electrode material including a sulfide compound containing a tetrazole ring as an active substance, wherein the tetrazole ring of the sulfide compound includes a material represented by the following formula:

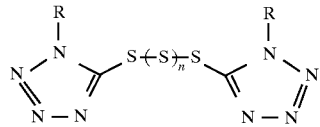

wherein each R represents a hydrogen atom or an organic group, provided that at least one R is a methyl group, and n is 2.

7. An electrode comprising: an electrode material including a sulfide compound containing a tetrazole ring as an active substance, wherein the tetrazole ring of the sulfide compound includes a material represented by the following formula:

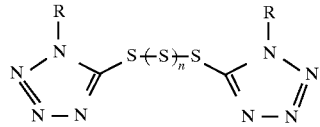

wherein each R represents a hydrogen atom or an organic group, provided that at least one R is a phenyl group, and n represents an integer from 0 to 5.

8. The electrode according to claim 7, wherein n is 0.
9. The electrode according to claim 7, wherein n is 1.
10. The electrode according to claim 7, wherein n is 2.
11. The electrode according to claim 7, wherein both R groups are phenyl groups.

12. A secondary battery comprising:
a cathode made of a sulfide material having a tetrazole ring as an active material, wherein the tetrazole ring of the sulfide material includes a material represented by the following formula:

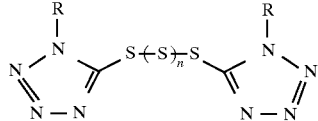

wherein each R represents a hydrogen atom or an organic group, provided that at least one R is a methyl group, and n is 1; and
an anode comprising an alkali metal.

13. A secondary battery comprising:
a cathode made of a sulfide material having a tetrazole ring as an active material, wherein the tetrazole ring of the sulfide material includes a material represented by the following formula:

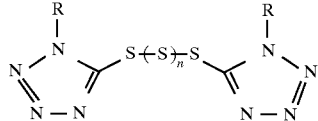

wherein each R represents a hydrogen atom or an organic group, provided that at least one R is a methyl group, and n is 2; and
an anode comprising an alkali metal.

14. A secondary battery comprising:
a cathode made of a sulfide material having a tetrazole ring as an active material, wherein the tetrazole ring of the sulfide material includes a material represented by the following formula:

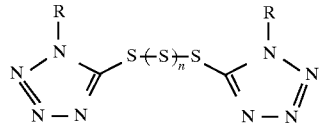

wherein each R represents a hydrogen atom or an organic group, provided that at least one R is a phenyl group, and n represents an integer from 0 to 5; and
an anode comprising an alkali metal.

15. The secondary battery according to claim 14, wherein n is 0.
16. The secondary battery according to claim 14, wherein n is 1.
17. The secondary battery according to claim 14, wherein n is 2.
18. The secondary battery according to claim 14, wherein both R groups are phenyl groups.
19. A secondary battery comprising:
a cathode made of a sulfide material having a tetrazole ring as an active material, wherein said sulfide material is 5,5'-dithiobis (1-phenyltetrazole), 5,5'-trithiobis (1-phenyltetrazole), or 5,5'-tetrathiobis (1-phenyltetrazole); and
an anode comprising an alkali metal.

* * * * *